United States Patent
Fahlborg et al.

(10) Patent No.: US 12,493,228 B2
(45) Date of Patent: Dec. 9, 2025

(54) FLASH HOUSING FOR PHOTOGRAPHIC PURPOSES, A SET COMPRISING A FLASH HOUSING FOR PHOTOGRAPHIC PURPOSES AND AT LEAST ONE FLASH LIGHT SHAPING TOOL, AND A FLASH LIGHT SHAPING TOOL

(71) Applicant: Profoto Aktiebolag, Sundbyberg (SE)

(72) Inventors: Philip Fahlborg, Nacka (SE); Peter Pinzke, Bromma (SE)

(73) Assignee: Profoto Aktiebolag, Sundbyberg (SE)

(*) Notice: Subject to any disclaimer, the term of this patent is extended or adjusted under 35 U.S.C. 154(b) by 0 days.

(21) Appl. No.: 18/301,587

(22) Filed: Apr. 17, 2023

(65) Prior Publication Data

US 2023/0350272 A1    Nov. 2, 2023

Related U.S. Application Data

(63) Continuation of application No. 16/629,019, filed as application No. PCT/SE2018/050945 on Sep. 17, 2018, now Pat. No. 11,630,375.

(30) Foreign Application Priority Data

Sep. 18, 2017 (SE) .................... 1751152-8

(51) Int. Cl.
*G03B 15/05* (2021.01)
*G03B 15/06* (2021.01)

(52) U.S. Cl.
CPC ............. *G03B 15/05* (2013.01); *G03B 15/06* (2013.01); *G03B 2215/0585* (2013.01); *G03B 2215/0592* (2013.01)

(58) Field of Classification Search
None
See application file for complete search history.

(56) References Cited

U.S. PATENT DOCUMENTS

| | | |
|---|---|---|
| 3,049,611 A | 8/1962 | Kluge |
| 4,141,059 A | 2/1979 | Shiojiri |
| | (Continued) | |

FOREIGN PATENT DOCUMENTS

| | | |
|---|---|---|
| CA | 2977859 A1 | 12/2016 |
| CN | 1688927 A | 10/2005 |
| | (Continued) | |

OTHER PUBLICATIONS

International Search Report and Written Opinion of the International Searching Authority for International Application No. PCT/SE2018/050945, mailed on Dec. 17, 2018, in 16 pages.

(Continued)

*Primary Examiner* — Stephanie E Bloss
*Assistant Examiner* — Diana Hancock
(74) *Attorney, Agent, or Firm* — Knobbe, Martens, Olson & Bear, LLP

(57) ABSTRACT

A flash housing for photographic purposes. The flash housing comprises can include a flash forming element arranged to generate a flash light, a lens element arranged to let at least part of the generated flash out of the flash housing so as to obtain a flash light, and a fastening element for attachment of a flash light shaping tool on top of the lens element. The fastening element can be arranged at least partly along a border of the lens element for magnetic engagement with a corresponding fastening element at the flash light shaping tool.

36 Claims, 7 Drawing Sheets

(56) References Cited

U.S. PATENT DOCUMENTS

| | | | |
|---|---|---|---|
| 5,208,624 A | 5/1993 | MacKay | |
| 5,353,211 A | 10/1994 | Merko | |
| 5,839,006 A | 11/1998 | Beckerman | |
| 6,088,543 A | 7/2000 | Kaji et al. | |
| 6,889,006 B2 | 5/2005 | Kobayashi | |
| 7,360,909 B1 | 4/2008 | Hughes | |
| 7,519,287 B2 | 4/2009 | Mok et al. | |
| 7,978,971 B1 | 7/2011 | Honl | |
| 8,348,442 B2 | 1/2013 | Jefferson, III | |
| 8,712,234 B1* | 4/2014 | Lau | G03B 15/06 396/544 |
| 8,886,027 B1 | 11/2014 | Shapir | |
| 9,004,703 B2 | 4/2015 | Li | |
| 9,042,719 B2 | 5/2015 | Xu | |
| 9,049,361 B2 | 6/2015 | Hirasawa et al. | |
| 9,158,180 B2 | 10/2015 | Baker et al. | |
| 9,285,659 B2 | 3/2016 | Yokoyama | |
| 10,054,846 B1 | 8/2018 | Boerup | |
| 10,942,423 B1 | 3/2021 | Coughenour et al. | |
| 11,079,663 B1 | 8/2021 | Boerup | |
| 11,630,375 B2* | 4/2023 | Fahlborg | G03B 15/05 348/371 |
| 2002/0064384 A1 | 5/2002 | Kawasaki et al. | |
| 2005/0025473 A1 | 2/2005 | Hirai | |
| 2006/0109641 A1 | 5/2006 | Fong | |
| 2008/0259588 A1 | 10/2008 | Fong | |
| 2008/0260372 A1 | 10/2008 | Shin | |
| 2010/0124041 A1 | 5/2010 | Druchinin | |
| 2011/0255851 A1 | 10/2011 | Honl | |
| 2012/0051061 A1 | 3/2012 | Ye | |
| 2012/0154627 A1* | 6/2012 | Rivard | H04N 23/88 348/E9.051 |
| 2012/0268913 A1 | 10/2012 | Ng et al. | |
| 2013/0176482 A1 | 7/2013 | Hirasawa et al. | |
| 2014/0334124 A1 | 11/2014 | Mo Chau | |
| 2014/0368731 A1 | 12/2014 | Hyers | |
| 2014/0375828 A1 | 12/2014 | Miller et al. | |
| 2015/0212392 A1 | 7/2015 | Man | |
| 2015/0370145 A1 | 12/2015 | Shin | |
| 2018/0140196 A1* | 5/2018 | Khosravi Simchi | A61B 90/36 |
| 2018/0205864 A1* | 7/2018 | Harden | H04N 23/56 |
| 2020/0233282 A1 | 7/2020 | Fahlborg et al. | |

FOREIGN PATENT DOCUMENTS

| | | |
|---|---|---|
| CN | 1916751 A | 2/2007 |
| CN | 1972377 A | 5/2007 |
| CN | 101351744 A | 1/2009 |
| CN | 201628835 U | 11/2010 |
| CN | 201716503 U | 1/2011 |
| CN | 102062332 A | 5/2011 |
| CN | 102116998 A | 7/2011 |
| CN | 201903739 U | 7/2011 |
| CN | 202110362 U | 1/2012 |
| CN | 102346354 A | 2/2012 |
| CN | 202403105 U | 8/2012 |
| CN | 201220577299.3 | 10/2012 |
| CN | 202857103 U | 4/2013 |
| CN | 202870443 | 4/2013 |
| CN | 203385974 U | 1/2014 |
| CN | 203811960 U | 9/2014 |
| CN | 203909860 U | 10/2014 |
| CN | 204284969 U | 4/2015 |
| CN | 204314583 U | 5/2015 |
| CN | 205176457 U | 4/2016 |
| CN | 201520982580.9 | 4/2016 |
| CN | 201620371237.X | 4/2016 |
| CN | 201620715190.X | 7/2016 |
| CN | 106027892 A | 10/2016 |
| CN | 205824797 U | 12/2016 |
| CN | 206039117 U | 3/2017 |
| CN | 201620844715.X | 3/2017 |
| CN | 206191526 U | 5/2017 |
| CN | 201621203207.X | 5/2017 |
| CN | 206329962 U | 7/2017 |
| CN | 206908647 U | 1/2018 |
| CN | 201811086537.9 | 9/2018 |
| CN | 201821523510.7 | 9/2018 |
| CN | 209248218 U | 8/2019 |
| CN | 109521629 A | 7/2023 |
| CN | 109521629 B | 7/2023 |
| EP | 3685229 B1 | 7/2024 |
| GB | 2497129 A | 6/2013 |
| JP | 2007-206137 A | 8/2007 |
| JP | 2009-020298 A | 1/2009 |
| JP | 2011-137959 A | 7/2011 |
| JP | 2013-142883 A | 7/2013 |
| KR | 2004-48503 Y1 | 4/2010 |
| KR | 10-2101785 B1 | 4/2020 |
| TW | 200720813 A | 6/2007 |
| WO | WO 2011/072604 | 6/2011 |
| WO | WO 2016/205950 A1 | 12/2016 |

OTHER PUBLICATIONS

Extended European Search Report for European Patent Application No. 18856800.0, dated Mar. 26, 2021, in 7 pages.
Abelcine, "At the Bench: Fiilex P360 Pro Plus" Jun. 20, 2017, [cited Aug. 23, 2024] Available from: [https://www.youtube.com/watch?v= 1 kj71kGtm_I] original file name: E6 youtube video—Fiilex P360 Pro LED light.PDF.
Rickroeven, "MagMod flash modifiers review" Jun. 21, 2015, [cited Aug. 23, 2024] Available from: [https://ricksreviews .org/blog/2015/06/21 /magmod-flash-modifiers-review/] original file name: E5 Mag Mod flash.pdf.
EPO Notice of Opposition for Applocation No. 18856800 mailed Feb. 12, 2025 in 41 pages.
Aldred, J., & About John AldredJohn Aldred is based in Lancaster. (Sep. 15, 2017). "Photos show Profoto is expanding their range with first ever Speedlight." DIY Photography. https://www.diyphotography.net/photos-show-profoto-expanding-range-first-ever-speedlight/ https://web.archive.org/web/20170917132114/https://www.diyphotography.net/photos-show-profoto-expanding-range-first-ever-speedlight/.
Cade, D. (Sep. 15, 2017). Leak: Profoto is preparing to release its first ever Speedlight, theProfoto A1. DPReview. https://www.dpreview.com/news/8855464127/leak-profoto-is-preparing-to-release-its-first-ever-speedlight-the-profoto-a1.
Decision on Examination of Request for Invalidation for CN 201811086537.9, 2024072700100990, dated Dec. 6, 2024, 91 pages.
Documents Mentioned in the Hearing for CN 201811086537.9, dated Nov. 23, 2023, 32 pages.
Decision on Examination of Request for Invlidation for CN 201811086537.9, 2024072700103810, dates Jul. 31, 2024, 21 pages.
Decision on Examination of Request for Invlidation for CN 201811086537.9, 2024072700100990, dates Jul. 31, 2024, 21 pages.
Extended European Search Report for European Patent Application No. 24185251.6, dated Nov. 10, 2024, in 7 pages.
Ex Parte Re-Exam, U.S. Pat. No. 11,630,375 Issued Apr. 18, 2023, received Nov. 19, 2024, in 90 pages.
Notification of Transferring Documents for CN201811086537, dated May 17, 2024, 183 pages.
Notification of Transferring Documents for CN201811086537, dated Apr. 10, 2024, 46 pages.
3DP.Lighting, Illumarco, The Relio Flen—World's first Flashlight Collimator for Smartphones, May 11, 2016, www.3dprinting.lighting/relio-flens-flashlight-collimator/, 5 pages.
Gigazine, F.lens to expand the flashlight for smartphone by 10 times, May 14, 2016, https://gigazone.net/gsc_news/en/20160514-flens/, 17 pages.
EPO Communication to Rule 114(2) EPC, Application No. 18856800.0, dated Apr. 22, 2024, in 44 pages.
Lee Sedol, Winner of 18 world Go titles. "AlphaGo." Google DeepMind, deepmind.google/research/breakthroughs/alphago. Accessed May 13, 2025. https://deepmind.google/research/breakthroughs/alphago/.
Reilly, Michael, "Here Come the Mind-Blowing Smartphones Sensorts That Could Bring AR to the Masses", MIT Technology Review, (2017) https://www.technologyreview.com/2017/08/15/149879/here-

(56) References Cited

OTHER PUBLICATIONS come-the-mind-blowing-smartphonesensors-that-could-bring-ar-to-the-masses/.
Eisenberg, et al. "Reexamination Statistics and the Federal Circuit's SNQ Clarification/Expansion", PTAB Year in Review 2023, https://www.sternekessler.com/app/uploads/2024/02/Reexamination-Statistics-and-the-Federal-Circuits-SNQ-Clarification-Expansion.pdf.
Godox Knowled. (n.d.). TTL Li-ion Round Head Camera Flash V1C/N/S/F/O/P. V1-product-GODOX Photo Equipment Co.,ltd., Retrieved from https://www.godox.com/product-d/V1.html on Aug. 5, 2025.
Amazon. (n.d.). Amazon.com: Godox V1 Pro V1Pro-C Camera Flash Speedlight, Godox V1-C Upgraded Version for Canon Cameras. Retrieved from https://www.amazon.com/V1Pro-C-Speedlight-Upgraded-Version-Cameras/dp/BOCSW5LB5L on Aug. 5, 2025.
Amazon. (n.d.). Amazon.com: GODOX AD100Pro Pocket studio flash light photography light oled screen 5800K 1/8000s sync TTL/multi/M flash built-in 2.4G wilreless X system 5 groups 32 channels with rechargeable 2600mAh Battery: Electronics. Retrieved from https://www.amazon.com/GODOX-AD100Pro-Photography-Wireless-Rechargeable/dp/B08S6RDSJH on Aug. 5, 2025.
Godox Knowled. (n.d.). H200R Round Flash Head for AD200. H200R-product-GODOX Photo Equipment Co., ltd., retrieved from https://www.godox.com/product-d/H200R.html on Aug. 5, 2025.
Amazon. (n.d.-b). Amazon.com: Godox V1 pro S flash for Sony cameras, v1prou-S 2.4G wireless HSS TTL round head speedlite with diffuser, detachable sub flash, type-C charging, 1.3s recycle time, 500 full-power flashes (US version) : Electronics. Retrieved from https://www.amazon.com/Sony-V1ProU-S-Speedlite-Detachable-Full-Power/dp/BODR8DWLWD on Aug. 5, 2025.
Amazon. (n.d.-c). Amazon.com: Godox V100 C godox flash for canon—100WS TTL flash for canon EOS cameras, touchscreen control, 400-full-power-flashes, 1.7s recycle time, 2.4g wireless with external-flash: Electronics. Retrieved from https://www.amazon.com/GODOX-V100-Godox-Canon-400-Full-Power-Flashes/dp/BODPKW4CK9 on Aug. 5, 2025.
Amazon. (n.d.-c). Amazon.com: Godox V860III-N Flash Speedlite, Quicker Release Lock 2.4G i-TTL HHS 1/8000S 5300K ± 200K 7.2V/2600mAh 1.5s Recycle Time 480 Full Power Pops for Wedding Portrait Studio Indoor Outdoor Photography. Retrieved from https://www.amazon.com/dp/BODDTL3921 on Aug. 5, 2025.
Amazon. (n.d.-d). Regarding removing FBA inventory for suspended account. Retrieved from https://sellercentral.amazon.com/seller-forums/discussions/t/3396ada08799dbf2c62b0aba847f76b5 on Aug. 5, 2025.
Lipperd, Nicholas, "Is Amazon's Apex the Top Option for Patent Rights?", Washington Journal of Law, Technology & Arts, Jan. 31, 2023, https://wjlta.com/2023/01/31/is-amazons-apex-the-top-option-for-patent-rights/.
Plaintiff's Answer to Counterclaims and Counter-Counterclaims dated Jul. 9, 2025 in 39 pages.
Mar. 20, 2025 Complaint for Declaratory Judgment Demand for Jury Trial, *Godox Photo Equipment Co., Ltd.* v. *Profoto Aktiebolag*, Case No. 2:25-cv-502, 52 pages.
May 5, 2025 Declaration of Ziyong Li in Support of Plaintiff's Motion for Temporary Restraining Order, *Godox Photo Equipment Co., Ltd.* v. *Profoto Aktiebolag*, Case No. 2:25-cv-00502-KKE, in 3 pages.
May 5, 2025 Plaintiff's Motion for Temporary Restraining Order, Alternative Service, Expedited Discovery, and Order to Show Cause Why a Preliminary Injunction Should Not Issue, *Godox Photo Equipment Co., Ltd.*, v. *Profoto Aktiebolag*, Case No. 2:25-cv-00502-KKE, in 31 pages.
Chinese Notification for Accepting the Invalidation Request for App. No. 201821523510.7 dated Apr. 1, 2020 in 114 pages.
Jul. 31, 2025 Order Denying Plaintiff's Motion for Preliminary Injunction, *Godophoto Equipment Co., Ltd.* v. *Profoto Aktiebolag*, Case No. 2:25-cv-00502-KKE, in 18 pages.
Aug. 28, 2025 Defendant Profoto Aktiebolag's First Amended Answer and Affirmative Defenses to Counter-Counterclaims, *Godox Photo Equipment Co., Ltd.* v. *Profoto Aktiebolag*, Case No. 2:25-cv-00502-KKE, in 11 pages.
EPO Brief Communication, Application No. EP18856800.0, dated Sep. 2, 2025, in 6 pages.
Vu, Binh V et al. "Flash Characterization of Smartphones Used in Point-of-Care Diagnostics." Biosensors vol. 12,12 1060. Nov. 22, 2022, doi:10.3390/bios12121060.
Flens—The first nashlight booster for smartphones. Klckslarter Campaign, https://www.kickstarter/projectslbasllicolflens-the-first-nashtighl.boosler-for-sma11phones/description and https1iwNw.kickslarter.com/projects/baslllco/nens-lhe-first-flashlight-booster-for•smartphones/faqs (Year: 2016).
Relio. (May 9, 2016). *Flens—The first flashlight booster for smartphones.* YouTube. https://www.youtube.com/watch?v=nrLIPMaqCPc&t=10s.
Summons To Attend Oral Proceedings pursuant to Rule 115(1) EPC for App. No. 8856800.0 dated Oct. 22, 2025 in 23 pages.
Consolidated List for EP 18 856 800.0 dated Oct. 22, 2025 in 1 page.

\* cited by examiner

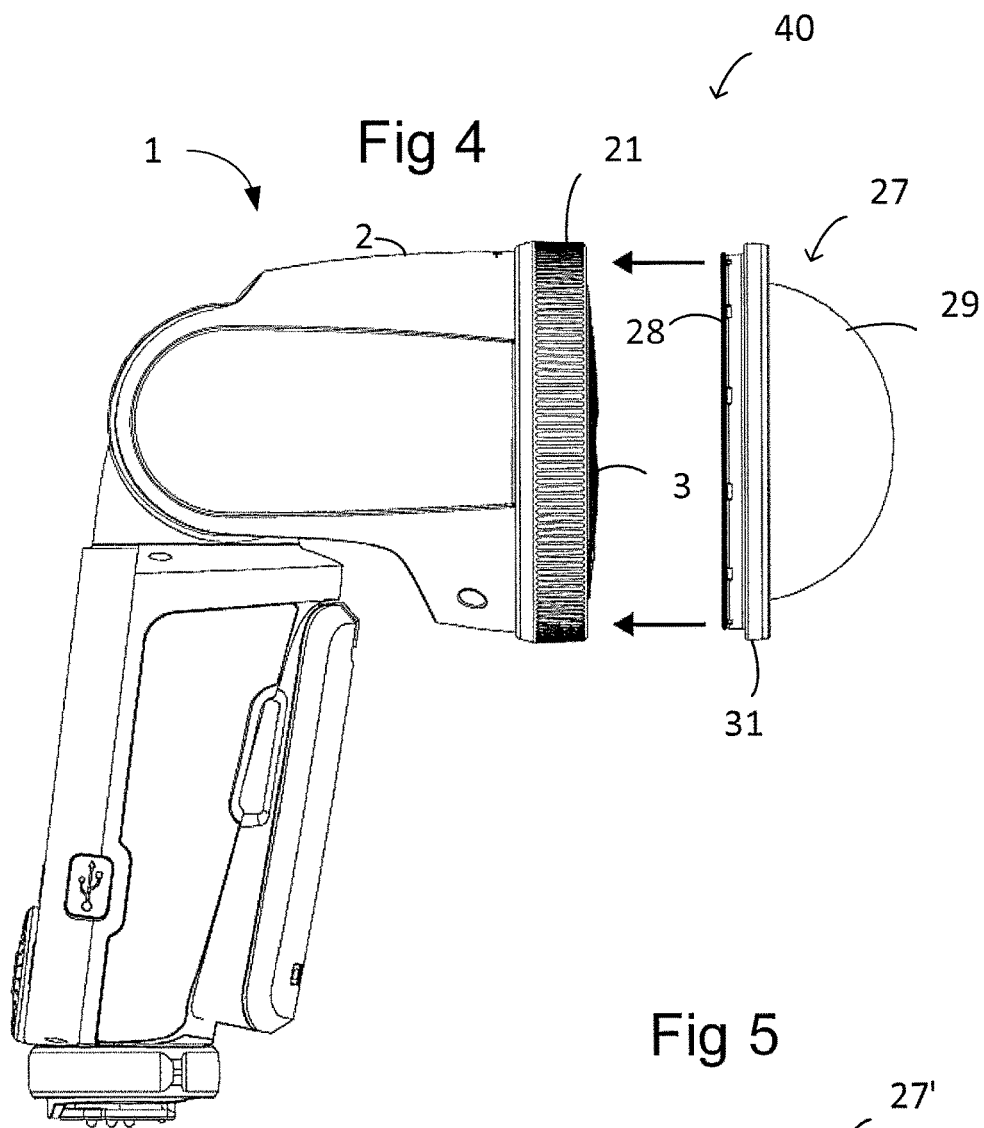

Fig 9
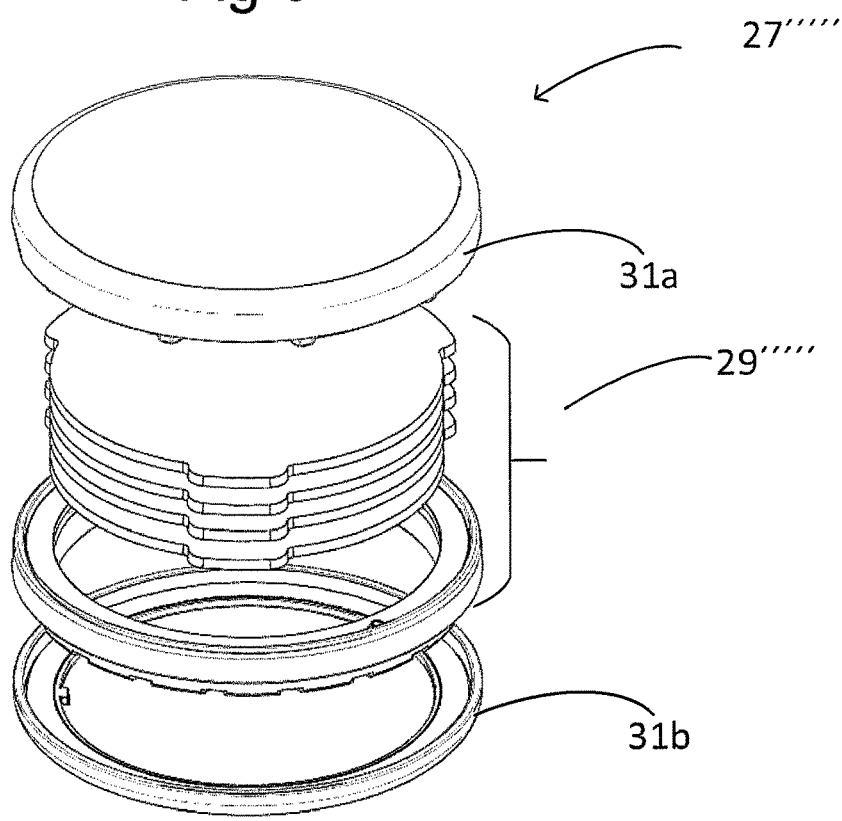
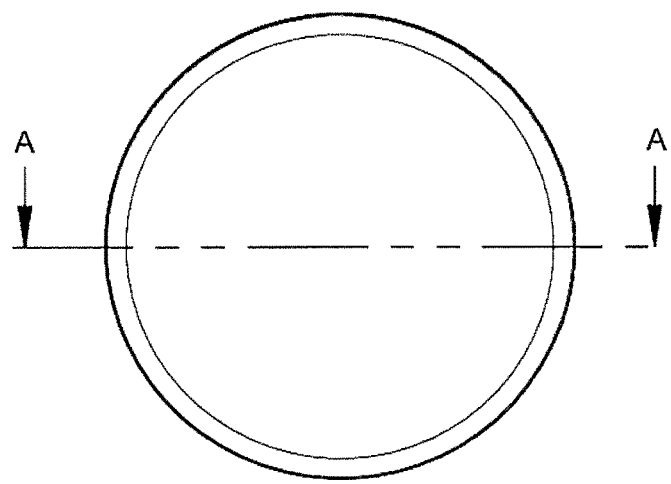
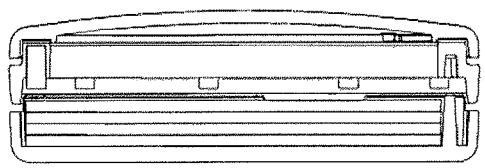
SECTION
A-A

FLASH HOUSING FOR PHOTOGRAPHIC PURPOSES, A SET COMPRISING A FLASH HOUSING FOR PHOTOGRAPHIC PURPOSES AND AT LEAST ONE FLASH LIGHT SHAPING TOOL, AND A FLASH LIGHT SHAPING TOOL

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

TECHNICAL FIELD

The present disclosure relates to a flash housing for photographic purposes.

The present disclosure further relates to a set comprising a flash housing for photographic purposes and at least one flash light shaping tool.

The present disclosure further relates to a flash light shaping tool for attachment to a flash housing for photographic purposes.

BACKGROUND

In order to be able to take photographs of a certain quality a flash device is often used to provide light or to improve the light in the photograph.

There are flash housings known in the art arranged to generate a flash light and to let at least part of the generated flash light out of the flash housing so as to obtain the flash light.

It is known in the art to use of flash light shaping tools for enhancing the flash light properties.

SUMMARY

One object of the present disclosure is to obtain an improve use of flash light shaping tools.

This has in accordance with different embodiments of the disclosure been achieved by means of a flash housing for photographic purposes. The flash housing comprises a flash forming element arranged to generate a flash light, a lens element arranged to let at least part of the generated flash out of the flash housing so as to obtain a flash light, and a fastening element for attachment of a flash light shaping tool on top of the lens element. The fastening element is arranged at least partly along a border of the lens element for magnetic engagement with a corresponding fastening element at the flash light shaping tool.

The magnetic mounting of flash light shaping tools to the flash housing provides a mounting of flash light shaping tools which is user friendly and easy to use. Flash light shaping tools can easily be mounted and demounted to adapt the flash light as desired.

In different embodiments, the flash housing fastening element comprises at least one permanent magnet.

Alternatively, the flash housing fastening element may be at least partly formed by a ferromagnetic material arranged to magnetically engage with the fastening element of the flash light shaping tool, comprising at least one permanent magnet.

The flash housing fastening element may enclose the entire border of the lens element.

The lens element has in one option a substantially circular cross-section. The cross section is defined in a direction substantially perpendicular to the beam lobe axis of the flash light. The flash housing fastening element may when the lens element has a circular cross section comprise a ring shaped element. The ring shaped element may be provided with the permanent magnet(s). Alternatively, the ring shaped element may be at least partly made of the ferromagnetic material for magnetic engagement with permanent magnet(s).

The flash housing comprises in different embodiments a zoom element rotatably arranged coaxially with and outside the flash housing fastening element and operatively connected to the flash forming element so as to control movement of the flash forming element by manual rotation of the zoom element.

The present disclosure further relates to a set comprising a flash housing for photographic purposes and at least one flash light shaping tool, wherein the flash housing comprises a flash forming element arranged to generate a flash light and a lens element arranged to let at least part of the generated flash light out of the flash housing so as to obtain a flash light, and wherein the flash housing and the at least one flash light shaping tool comprises a respective fastening element for magnetic attachment of the flash light shaping tool on top of the lens element.

The flash housing fastening element may be arranged at least partly along the border of the lens element for magnetic engagement with the corresponding fastening element at the flash light shaping tool.

The flash housing fastening element may comprise at least one permanent magnet and the flash light shaping tool fastening element may be at least partly formed by a ferromagnetic material arranged to magnetically engage with the fastening element of the flash housing.

The fastening element of the flash light shaping tool comprises in one option at least one permanent magnet and the flash housing fastening element is in one option at least partly formed by a ferromagnetic material arranged to engage with the fastening element of the flash light shaping tool.

The flash housing fastening element and/or the flash light shaping tool fastening element may enclose the entire border of the lens element or at least one part thereof.

The flash light shaping tools are in one option stackable. The flash light shaping tools may be attachable to each other by magnetic engagement.

Accordingly, a plurality of flash light shaping tools may then be stacked on top of each other on the lens element to provide desired light shaping effects.

In practice, each of the at least one flash light shaping tool may then comprise a respective additional fastening element for magnetic attachment of another flash light shaping tool on top of one flash light shaping tool.

Different embodiments of the present disclosure relates to a flash light shaping tool for attachment to a flash housing for photographic purposes. The flash housing comprises a flash forming element arranged to generate a flash light and a lens element arranged to let at least part of the generated flash light out of the flash housing so as to obtain a flash light and a fastening element for attachment of a flash light shaping tool on top of the lens element. The flash light shaping tool comprises a first fastening element for magnetic attachment or engagement on top of the flash housing lens element.

The flash light shaping tool is in one option stackable. The flash light shaping tool may be attachable to another flash light shaping tool by magnetic engagement. Accordingly, the flash light shaping tool may further comprise a second fastening element for magnetic engagement with another flash light shaping tool on top of the flash light shaping tool. Thus, the first and second fastening elements are arranged in the beam path at different sides of the flash light shaping tool.

In different embodiments, the flash light shaping tool comprises a holder for a flash light shaping element. The holder or flash light shaping element may be rotatable in relation to the lens element of the flash housing.

In different embodiments, the flash light shaping tool comprises a flash light shaping element attached or attachable to and extending from the holder. The flash light shaping element comprises a screen. The screen is arranged in the beam path of at least a part of the flash light. The flash light shaping element may also comprise a support for the screen. The holder may then hold the support, which in turn may hold the screen.

The screen may be at least partly reflective and arranged to re-direct at least a part of the flash light.

The screen may when mounted cover a part of the beam lobe of the flash light so that this part of the flash light is reflected by the screen and the rest of the flash light is not incident on and reflected by the screen. In use the screen may be arranged in a desired rotational position in relation to the flash housing. In use, the orientation of the flash housing may be orientated such that the part of the flash light which is incident on the screen is reflected towards the object to be photographed while the other part not incident on the flash light hits a bouncing surface such as the roof.

The screen may be arranged to diffuse at least a part of the flash light.

The screen may be made of a textile material.

The screen may be hood shaped.

When the flash light emitted from the lens element of the flash housing is incident on the interior of the hood, the hood reflects the incident light. The hood shape and the surface characteristics of the hood may cooperate to direct and diffuse flash light to obtain a softened light.

In different embodiments, the hood shaped screen is collapsible and spring loaded. The spring is substantially un-tensioned or semi-tensioned when the hood in its unfolded state and tensioned when the hood is in its collapsed state.

The flash light shaping element supported by the holder may comprise a lens.

The flash light shaping element may for example comprise a dome shaped diffuser element, a wide lens, a colour filter etc.

The first and/or second fastening element(s) may be accommodated in the holder.

The holder may comprise a first and a second holder part arranged to support an exchangeable flash light shaping element by magnetic engagement between the first and second holder parts.

The first and second fastening elements may be arranged to provide the magnetic engagement between the first and second holder parts.

The flash light shaping tool may further comprise third and fourth fastening elements arranged to provide the magnetic engagement between the first and second holder parts.

BRIEF DESCRIPTION OF THE DRAWINGS

FIG. 1b is a view from behind of the flash device in FIG. 1a.

FIG. 4 is a side view of a set comprising a flash device for photographic purposes and a flash light shaping tool according to one example.

FIG. 5 illustrates schematically a flash light shaping tool according to a first example.

FIG. 9 illustrates schematically a flash light shaping tool according to a fifth example.

DETAILED DESCRIPTION

The present disclosure relates in different embodiments to fastening of one flash light shaping tool, or a plurality of stacked flash shaping tools, on top of a lens element of a flash housing. The fastening is achieved by magnetic engagement or actuation. In practice, the flash housing has a fastening element arranged at least partly along a border of the lens element for magnetic engagement with a corresponding fastening element at the flash light shaping tool.

The flash light shaping tool is arranged to affect at least a part of the beam lobe emitted through the lens element of the flash housing to improve or adapt the properties of the flash light to achieve desired flash light effects in a photograph.

Figure 1A:
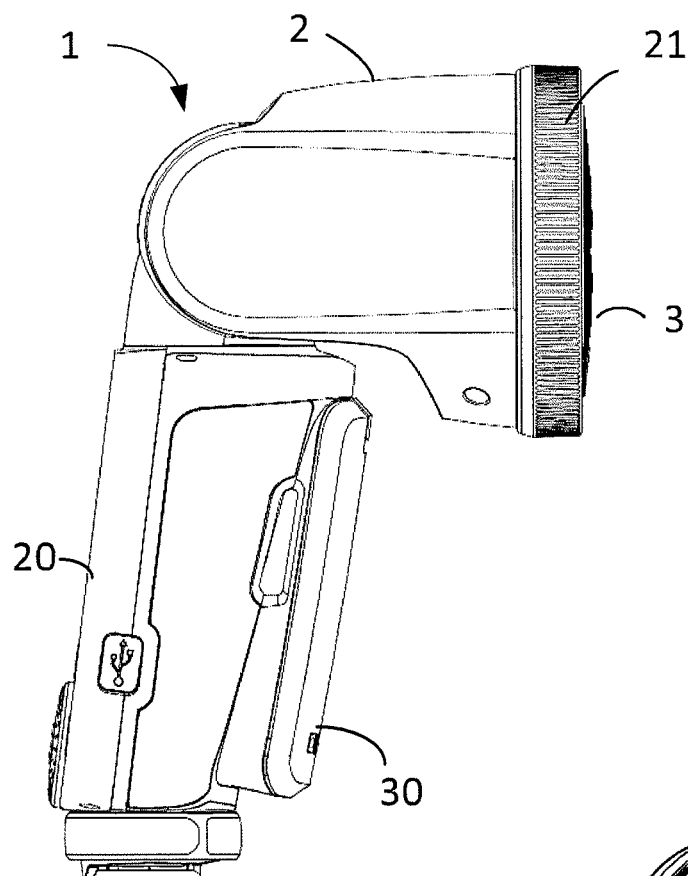
FIG. 1a is a side view of a flash device according to one example.
Figure 1B:
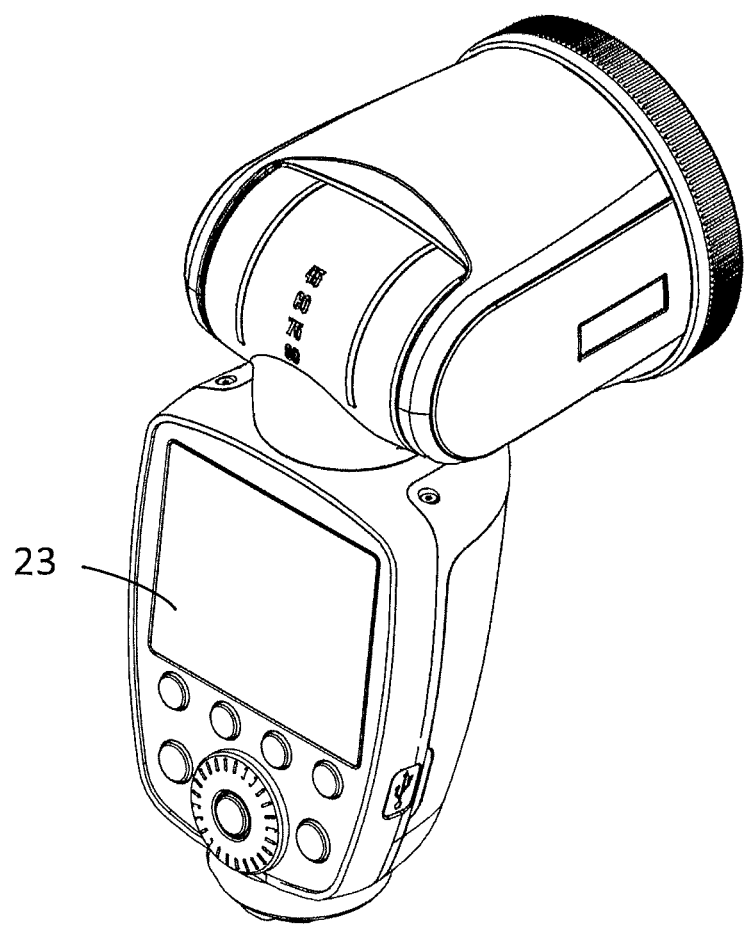

FIGS. 1a and 1b illustrate a flash device 1 according to one example. The flash device 1 is arranged to be used for photographic purposes. According to one example, the flash device 1 is arranged to be releasably attachable to a camera. The flash device 1 comprises in the illustrated example a flash holder 20 and a flash housing 2 hinged onto the flash holder 20. The flash device further comprises a releasable battery 30, attached to the flash holder 20. The flash housing is equipped with a lens element 3 arranged to affect the generated flash light in a desired way.

In the illustrated example, the flash device 1 further has a display element 23.

Figure 2:
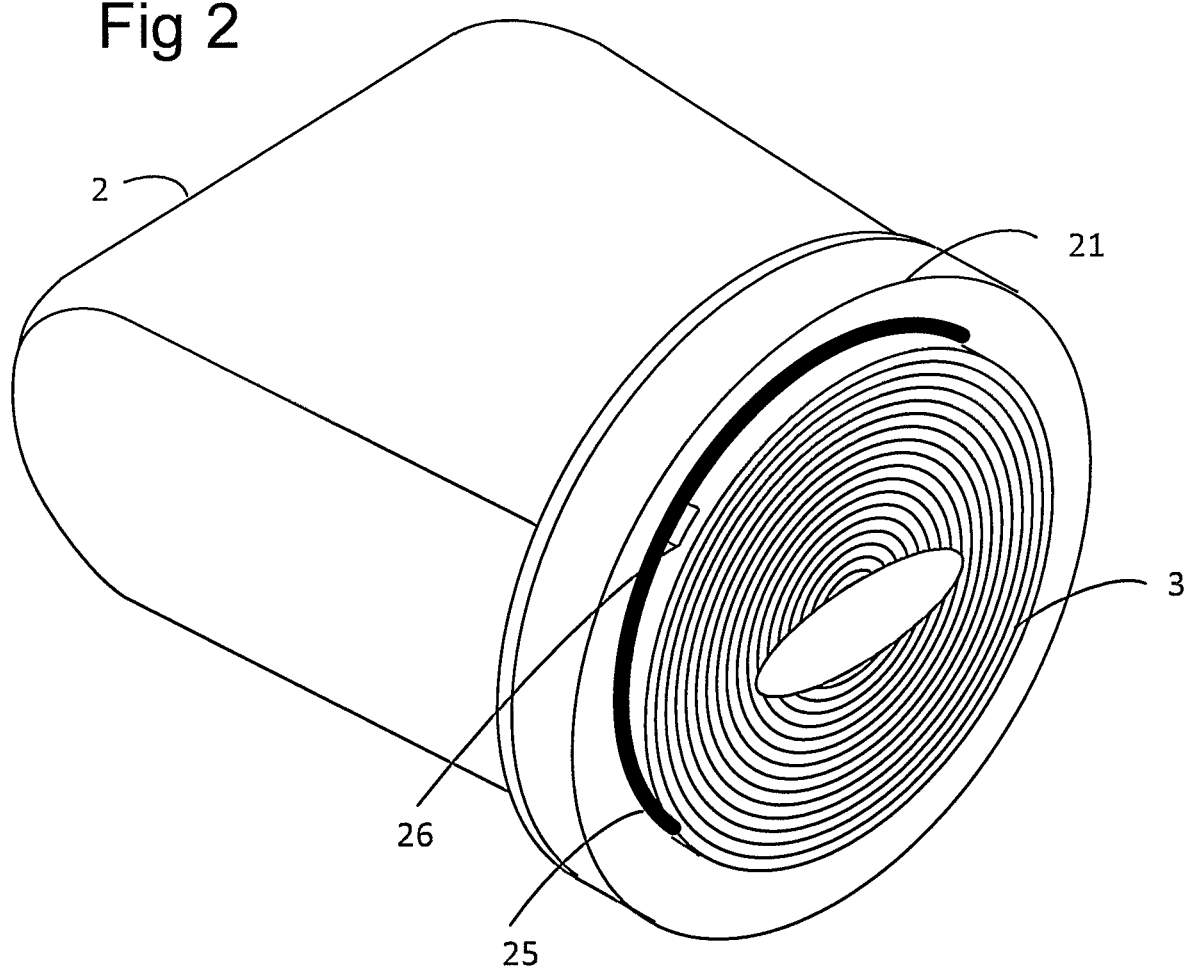
FIG. 2 is a perspective view of an example of a flash housing provided a fastening element.

In FIG. 2, a flash housing 2 for photographic purposes is illustrated. The flash housing is arranged to obtain a flash light. The flash housing comprises a lens element 3. The flash housing 2 comprises a flash forming element (not shown) arranged to generate a flash light. The lens element 3 is arranged to let at least part of the generated flash out of the flash housing so as to obtain a flash light. The lens element 3 has in the illustrated example a substantially circular cross-section. The cross section is characteristically arranged perpendicular to a main direction of the flash light let out of the lens element. The lens element may have any other shape such as an oval or rectangular shape.

The flash housing 2 comprises further at least one fastening element 25 for attachment of a flash light shaping tool (not shown) on top of the lens element 3. The at least one fastening element 25 is arranged at least partly along a border of the lens element 3 for magnetic engagement with a corresponding fastening element at the flash light shaping tool.

The fastening element 25 of the flash house may enclose the entire border of the lens element or a part thereof.

The flash housing fastening element 25 may comprise at least one permanent magnet 26. The flash housing fastening element may comprise a plurality of permanent magnets arranged along the border of the lens element 3.

In one example, the flash housing fastening element 25 comprises a supporting structure arranged along the border of the lens element 3, wherein the supporting structure holds one or a plurality of the permanent magnets 26. In an example, where the lens element is circular or oval, the supporting structure is ring shaped. The ring shaped supporting structure may be arranged at the edge of the lens element. Alternatively, the ring shaped supporting structure may be arranged on a part of the lens element external surface adjacent to the edge. Alternatively, the ring shaped supporting structure may be arranged at the flash housing coaxially with and outside the lens element 3. The ring shaped supporting structure may be made of a metal material.

The fastening element 25 may be so arranged that at least a part of the at least one permanent magnet 26 extends from the plane of the external lens element surface. Thereby the permanent magnet is easily accessible for attachment to the flash light shaping tool.

Alternatively, the fastening element 25 may be arranged in a recess in the housing, providing a guide for the mounting of the flash light shaping tool. Thereby the mounting is user friendly as a correct positioning of the flash light shaping tool on top of the lens element is facilitated.

Instead of comprising at least one permanent magnet, the fastening element 25 of the flash housing may be at least partly formed by a ferromagnetic material arranged to magnetically engage with the fastening element of the flash light shaping tool, wherein the fastening element of the flash light shaping tool comprises at least one permanent magnet. Also in accordance with this example, the fastening element may be arranged along at least a part of the border of the lens element 3. In an example, where the lens element is circular or oval, the fastening element may be ring shaped. The ring shaped fastening element may be arranged at the edge of the lens element. Alternatively, the ring fastening element may be arranged on a part of the lens element external surface adjacent to the edge. Alternatively, the ring shaped fastening element may be arranged at the flash housing coaxially with and outside the lens element. Also in the now discussed configuration example, where the fastening element is at least partly formed by a ferromagnetic material, the fastening element may be so arranged that it at least partly extends from the plane of the external lens element surface. Thereby the fastening element is easily accessible for attachment to the permanent magnet(s) of the fastening element of the flash light shaping tool. The fastening element may instead be arranged in a recess in the housing, providing a guide for the mounting of the flash light shaping tool. Thereby the mounting is user friendly as a correct positioning of the flash light shaping tool on top of the lens element is facilitated.

The flash housing may further comprise a zoom element 21 rotatably arranged coaxially with and outside the flash housing fastening element 25. The zoom element is operatively connected to the flash forming element so as to control movement of the flash forming element within the flash housing by manual rotation of the zoom element. This will be discussed more in detail later.

Figure 3:
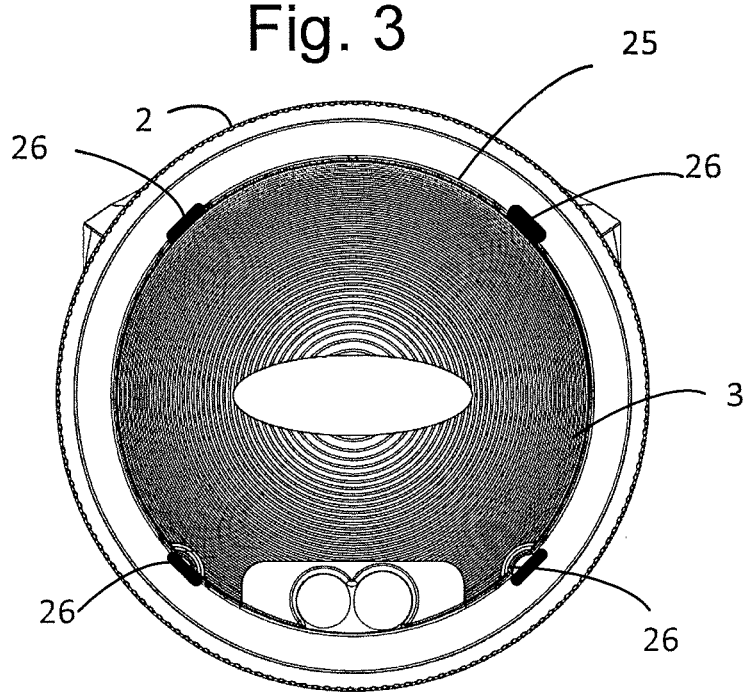
FIG. 3 is a front view of an example of a flash housing provided a fastening element.

FIG. 3 discloses a flash housing 2 for photographic purposes having at least some of the features as discussed in relation to FIG. 2. In the illustrated example, the flash housing comprises a lens element 3. Further the flash housing 2 comprises a further at least one fastening element 25 for attachment of a flash light shaping tool on top of the lens element 3. The at least one fastening element 25 is arranged at least partly along a border of the lens element 3 for magnetic engagement with a corresponding fastening element at the flash light shaping tool.

The fastening element 25 of the flash housing may enclose the entire border of the lens element or a part thereof.

The flash housing fastening element 25 may comprise at least one permanent magnet 26. The flash housing fastening element comprises in the illustrated example a plurality of permanent magnets arranged along the border of the lens element 3.

In FIG. 4, a set 40 is illustrated comprising a flash device 1 for photographic purposes and at least one flash light shaping tool 27. The flash device has a flash housing 2.

The flash housing 2 comprises a flash forming element arranged to generate a flash light (not shown). The flash housing comprises further a lens element 3 arranged to let at least part of the generated flash light out of the flash housing so as to obtain a flash light.

The flash housing 2 comprises further at least one fastening element (not shown) for attachment of the flash light shaping tool 27 on top of the lens element 3. The at least one fastening element of the flash housing is arranged at least partly along a border of the lens element 3 for magnetic engagement with a corresponding fastening element 28 at the flash light shaping tool.

The fastening element of the flash housing 2 may enclose the entire border of the lens element or a part thereof.

The flash housing fastening element may comprise at least one permanent magnet. The flash housing fastening element may comprise a plurality of permanent magnets arranged along the border of the lens element 3. Alternatively, the flash housing fastening element may be at least partly formed by a ferromagnetic material arranged to be attracted to the at least one permanent magnet of the flash housing fastening element.

The flash light shaping tool 27 comprises a holder 31 for a flash light shaping element 29. The holder supports the fastening element 28 for magnetic attachment of the flash light shaping tool on top of the lens element.

As mentioned above, the flash housing fastening element is arranged at least partly along the border of the lens element for magnetic engagement with the corresponding fastening element 28 at the flash light shaping tool 27.

In the example, where the flash housing fastening element comprises at least one permanent magnet, the flash light shaping tool fastening element 28 is at least partly formed by a ferromagnetic material arranged to engage with the fastening element of the flash housing. In an example, where the fastening element 28 of the flash light shaping tool 27 comprises at least one permanent magnet, the flash housing fastening element may at least partly be formed by a ferromagnetic material arranged to engage with the fastening element 28 of the flash light shaping tool. The flash housing fastening element and/or the flash light shaping tool fastening element 28 may be arranged to enclose the entire border of the lens element.

In the illustrated example, the lens element 3 may have has a substantially circular cross-section in a direction perpendicular to the main direction of the flash light let out of the lens 3. However, this is only an example. The lens element may for example instead have an oval or rectangular shape. The flash housing fastening element and the fastening element 28 of the flash light shaping tool 27 are designed to fit with the design of the lens element 3. The flash light shaping tool 27 comprises a flash light shaping element. In the illustrated example, the flash light shaping element is a dome shaped diffuser element 29. The dome shaped diffuser element 29 is arranged to diffuse and spread the flash light emitted via the lens element 3 omni directionally. This is for example used when bouncing the light in the ceiling to get a softer and less directional light. In operation, the user can then direct the flash housing against the surface, such as the ceiling, to bounce off from.

However, this is only an example. Flash shaping tools having different properties may be used provided with the magnetic mount disclosed herein. For example, the flash shaping tool may comprise a bounce card and/or a filter such as a colour filter and/or a wide lens. Examples of some flash light shaping tools will be discussed more in detail below. Further, the flash shaping tool may be stacked together with other light shaping tools. The flash light shaping tools are attachable to each other by magnetic engagement. This will be discussed more in detail below.

In FIG. 5, an example of light shaping tool 27' is illustrated. The light shaping tool may be stackable with other flash light shaping tools. The stackable flash light shaping tool 27' comprises a holder 31 arranged to support a flash light shaping element 29'. The holder 31 supports a fastening element 28 for magnetic attachment of the flash light shaping tool on top of the lens element or for magnetic attachment to another flash light shaping tool. The holder supports on its opposite side an additional fastening element 32 for magnetic attachment to another light shaping tool on top of the flash light shaping tool 27'.

Thereby, a plurality of stackable flash light shaping tools can be stacked together to shape the flash light in a plurality of steps. For example, the flash light let out of the lens element of the flash housing may be shaped by a wide lens and/or a colour filter and/or a bounce card by magnetically stacking together different flash light shaping tools, as desired.

When the fastening element 28 comprises at least one permanent magnet, the additional fastening element 32 comprises then characteristically a ferromagnetic material. When the fastening element 28 comprises a ferromagnetic material, the additional fastening element 32 comprises then characteristically at least one permanent magnet.

In the illustrated example, the flash light shaping element is a dome shaped diffuser element 29'. The dome shaped diffuser element 29' is arranged to diffuse and spread the flash light emitted via the lens element 3 omni directionally. This is for example used when bouncing the light in the ceiling to get a softer and less directional light. In operation, the user can then direct the flash housing against the surface, such as the ceiling, to bounce off from.

Figure 6:
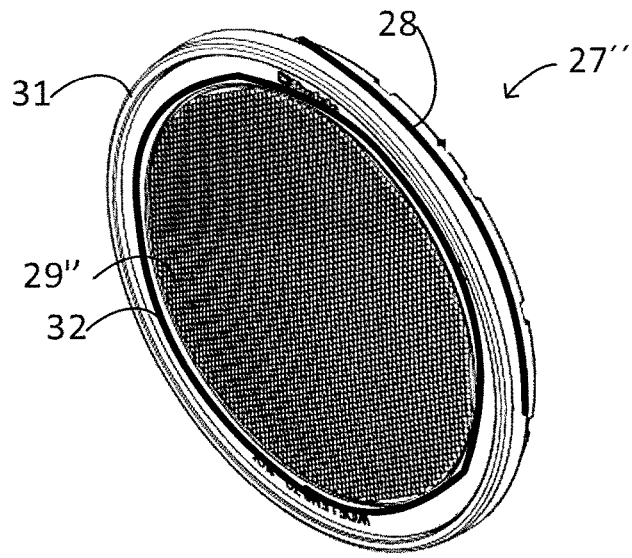
FIG. 6 illustrates schematically a flash light shaping tool according to a second example.

In FIG. 6, another example of a light shaping tool 27" is illustrated. The light shaping tool may be stackable with other flash light shaping tools. The flash light shaping tool 27" comprises a holder 31 arranged to support a flash light shaping element 29". The holder 31 supports a fastening element 28 for magnetic attachment of the flash light shaping tool on top of the lens element or for magnetic attachment to another flash light shaping tool. The holder may further support on its opposite side an additional fastening element 32 for magnetic attachment to another light shaping tool on top of the flash light shaping tool 27". Thereby, a plurality of stackable flash light shaping tools can be stacked together to shape the flash light in a plurality of steps. For example, the flash light let out of the lens element of the flash housing may be shaped by a wide lens and/or a colour filter and/or a bounce card by magnetically stacking together different flash light shaping tools, as desired.

When the fastening element 28 comprises at least one permanent magnet, the additional fastening element 32 comprises then characteristically a ferromagnetic material. When the fastening element 28 comprises a ferromagnetic material, the additional fastening element 32 comprises then characteristically at least one permanent magnet.

In the illustrated example, the flash light shaping element 29" is a wide lens. The wide lens may be used when a wider light spread is needed.

Figure 7A:
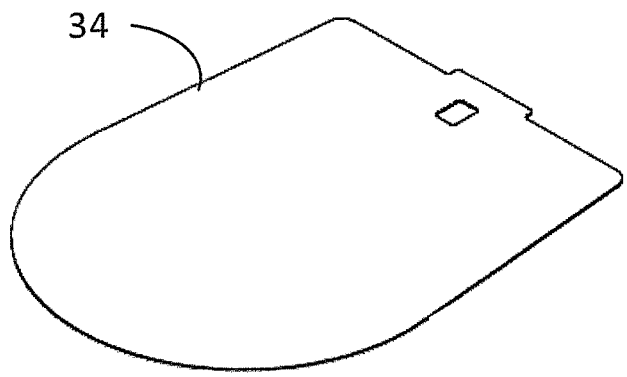
FIGS. 7a-c illustrates schematically a flash light shaping tool according to a third example.
Figure 7B:
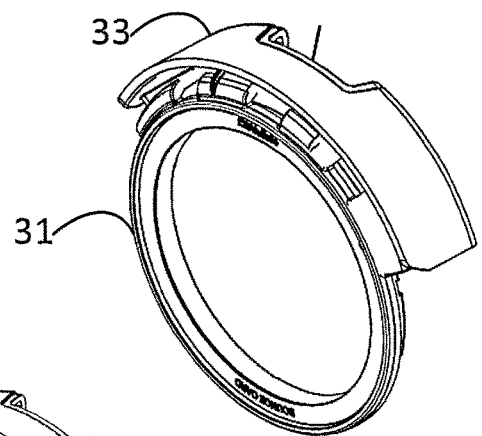
Figure 7C:
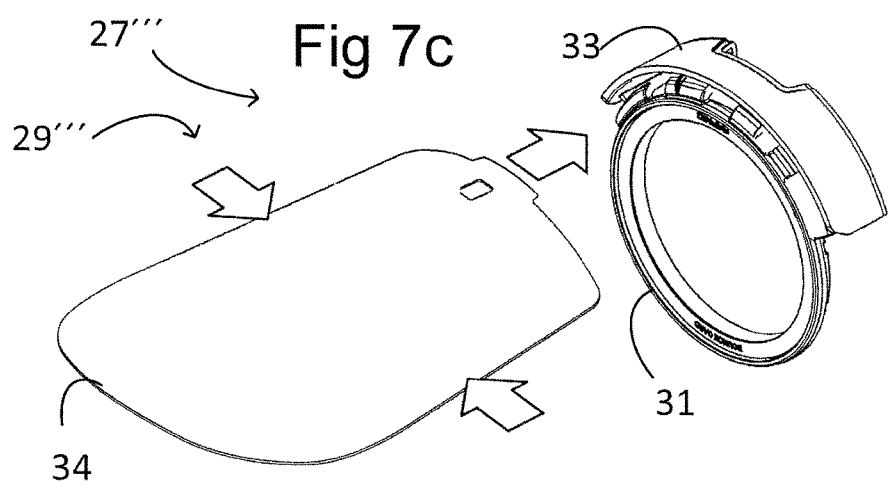

In FIGS. 7a-7c, yet another example of a flash light shaping tool 27''' is illustrated. The flash light shaping tool 27''' comprises a holder 31 for a flash light shaping element 29'''. The holder 31 is provided with a fastening element, as has been discussed for example in relation to FIGS. 5 and 6. The flash light shaping tool may be stackable. Accordingly, the holder 31 may be provided with fastening elements at both sides for magnetic engagement with other flash light tools or flash housing.

In the illustrated example, the flash light shaping element 29''' comprises a screen 34 attached or attachable to and extending from a support 33 for the screen 34. The support 33 is mounted to the holder 31. The screen 34 is mounted such that it is placed in the beam path of at least a part of the flash light. The screen may be rotated in relation to the flash housing to a desired position.

In the illustrated example, the screen 34 is at least partly reflective and arranged to re-direct at least a part of the flash light. The reflective screen 34 may be referred to as a bounce card. The application for the bounce card is similar to that of the dome shaped diffuser but provides a more directional light quality. The bounce card is in the illustrated example attached to the support 33 by squeezing the bounce card slightly and then pushing it firmly into the support 33 until the bounce card 34 locks in place.

The bounce card 34 covers characteristically when mounted a part of beam lobe of the flash light so that a part of the flash light is reflected by the bounce card and the rest of the flash light is not incident on the bounce card. In use, the bounce card may be rotated on the flash housing to direct the flash light as desired. In use the flash housing and/or bounce card may be orientated such that the part of the flash light which is incident on the bounce card is reflected towards the object to be photographed while the other part not incident on the flash light hits a bouncing surface such as the roof.

Figure 8A:
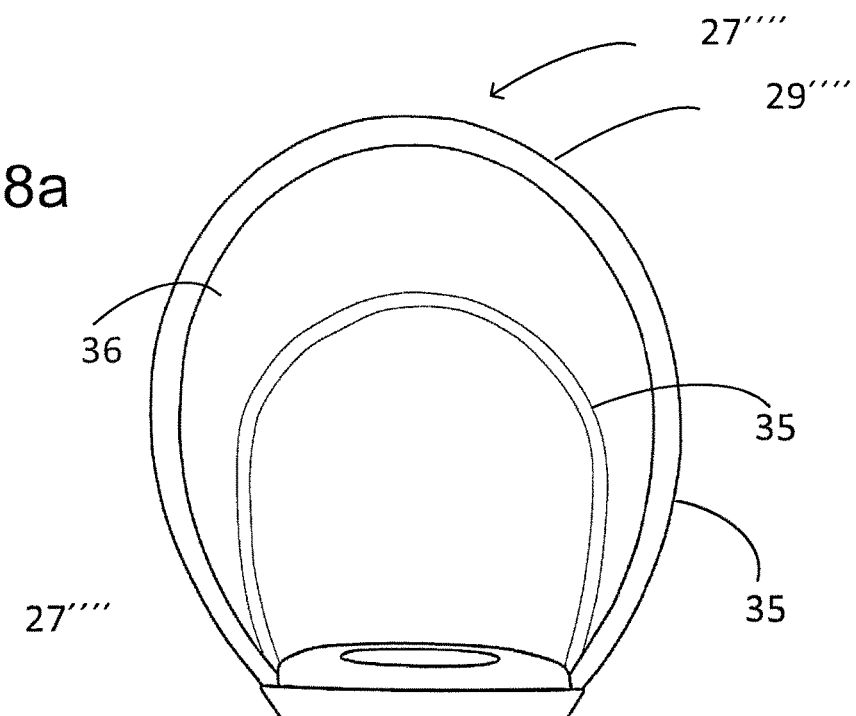
FIGS. 8a-c illustrates schematically a flash light shaping tool according to a fourth example.
Figure 8B:
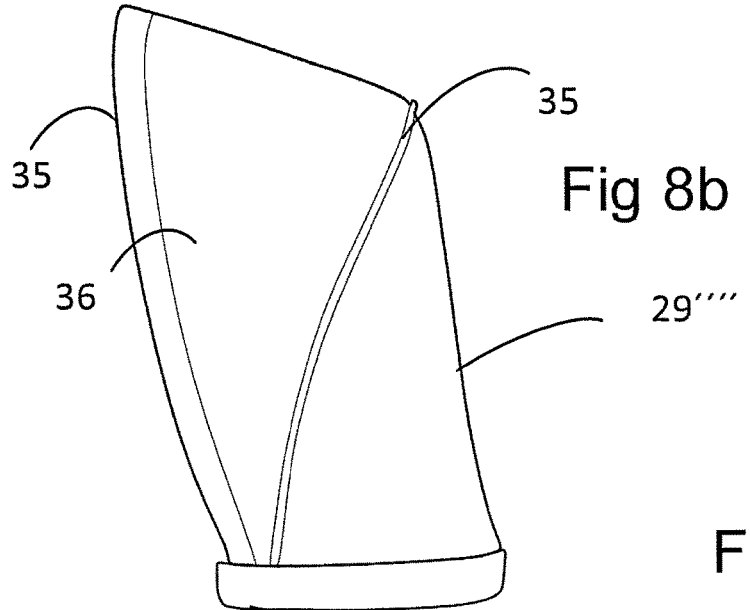
Figure 8C:
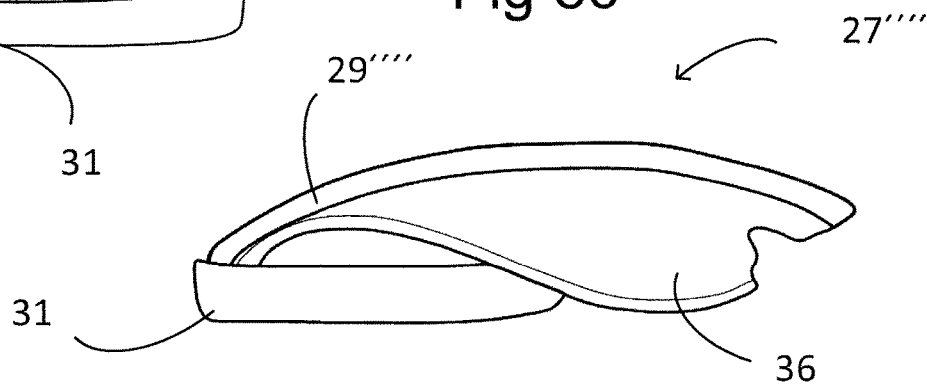

In FIGS. 8a-8c, another example of a flash light shaping tool 27'''' is illustrated. The light shaping tool may be stackable with other flash light shaping tools. This flash light shaping tool 27'''' is characteristically arranged to diffuse and direct the flash light to obtain a softened light. This flash light shaping tool 27'''' may for example be used for portrait photographing.

The flash light shaping tool 27'''' comprises a holder 31 for a flash light shaping element 29''''. The holder 31 is attachable to the flash light housing by means of a magnetic mount. The holder 31 has therefore fastening element(s) for example as discussed in relation to FIGS. 5 and 6.

In the illustrated example, the flash light shaping element 29'''' comprises a screen 36 attached or attachable to and extending from the holder 31. The screen 36 is mounted to the holder 31 such that it is placed in the beam path of at least a part of the flash light. The screen 36 is at least partly reflective and arranged to re-direct and/or diffuse at least a part of the flash light.

In the illustrated example, the screen 36 is hood shaped. Thus, it has side walls and a roof and an opening for letting out the flash light. At least a part of the flash light emitted from the lens element of the flash housing is incident on the interior of the hood. Thus, the hood functions as a large bounce card. In one example, substantially the whole beam lobe hits the interior of the hood.

The hood shaped screen 36 may for example be made of a textile material. The hood shape and the surface characteristics of the textile material cooperate to direct and diffuse the flash light to obtain the softened light.

The hood shaped screen 36 may be collapsible and spring loaded.

The hood may be formed by two or more textile pieces and at least two spring loaded arcs 35. The ends of the arcs 35 are supported in the holder 31. The textile material forms an envelope surface enveloping the arcs 35 mounted to the holder 31. The textile material further extends to the holder and is attached to the holder 31 to obtain the hood shape. One opening is defined in the hood to let out the flash light.

In one example, the spring (s) are semi-tensioned or substantially un-tensioned when the hood in its unfolded state and tensioned when the hood is in its collapsed state. The hood is characteristically collapsed by pushing the hood backwards. The flash light shaping tool 27'''' can then be stored in a package in the tensioned, collapsed state, where the package is sized to fit the flash light shaping tool 27'''' in the tensioned, collapsed state. Once the flash light shaping tool 27'''' has been removed from the package, the flash light shaping tool 27'''' is automatically resumed to the semi-tensioned or substantially un-tensioned, unfolded state.

In FIG. 9, an example of light shaping tool 27'''' is illustrated. The light shaping tool may be stackable. The stackable flash light shaping tool 27'''' has a holder comprises two holder parts 31a, 31b arranged to support one or a plurality of exchangeable flash light shaping elements 29''''. The holder parts 31a, 31b are arranged to support the flash light shaping element(s) by magnetic action between the first and second holder parts. The exchangeable flash light shaping elements may include different colour filters.

The holder parts 31a, 31b supports a fastening element (not shown) for magnetic attachment of the flash light shaping tool on top of the lens element or for magnetic attachment to another flash light shaping tool. The holder supports on its opposite side an additional fastening element (not shown) for magnetic attachment to another light shaping tool on top of the flash light shaping tool 27''''.

The fastening elements as discussed for example in relation to FIGS. 5 and 6 for enabling stacking of the light shaping tools magnetically may be designed to provide the magnetic action between the holder parts 31a, 31b. Alternatively, additional fastening elements are arranged at the holder parts 31a, 31b to provide the magnetic action between the holder parts.

Figure 10:
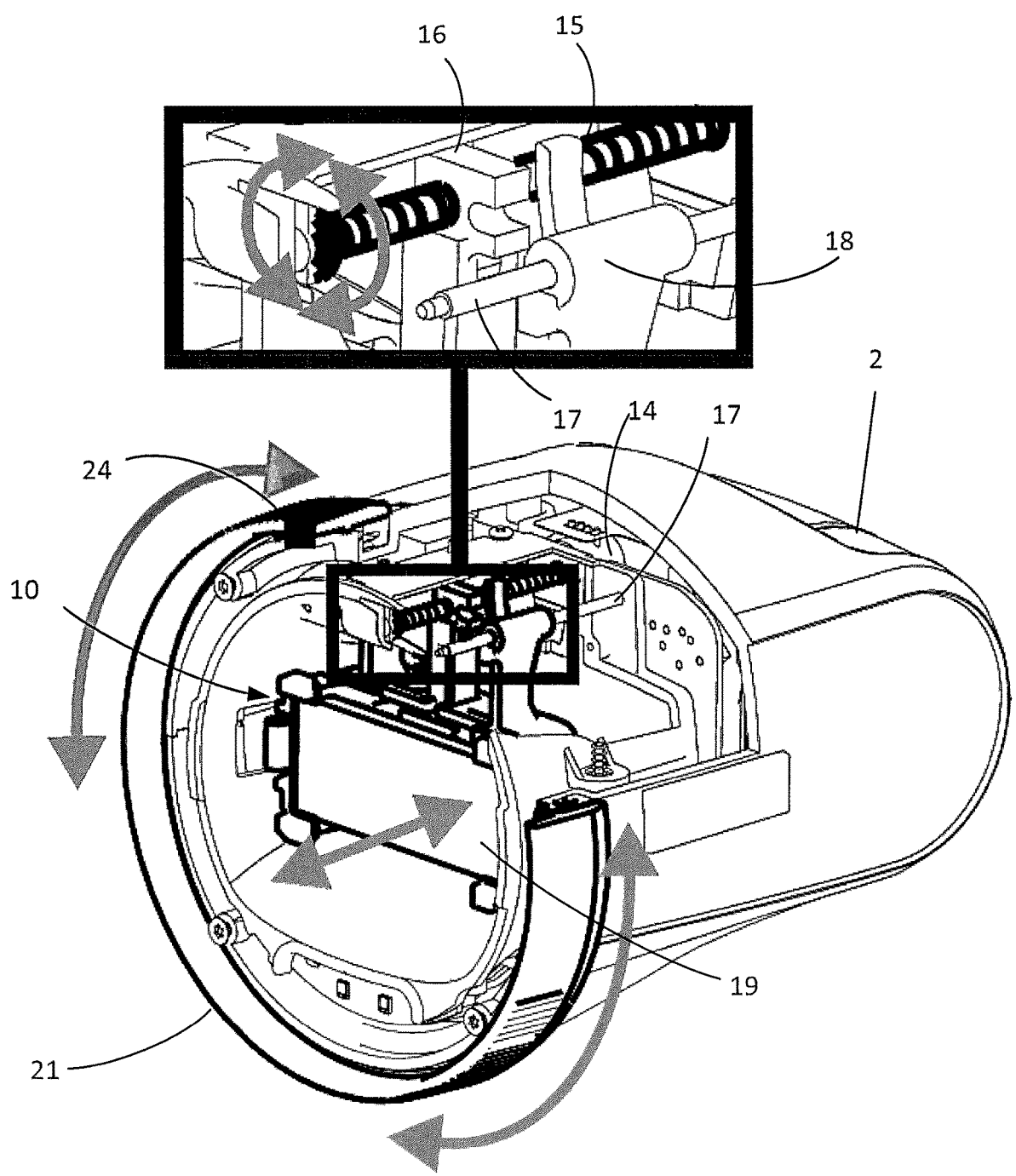
FIG. 10 is a perspective view illustrating an example of the interior of a flash housing.

In FIG. 10, a perspective view of illustrating an example of the interior of a flash housing 2 for photographic purposes is illustrated. The flash light shaping tool, or a plurality of stacked flash shaping tools, as discussed herein may be used together with flash housing as disclosed in this example.

The flash housing 2 comprises a zoom element 21 rotatably arranged at least partly along the circumference of the lens element (not shown). The zoom element 21 is operatively connected to the flash forming element 10 so as to control movement of the flash forming element by manual rotation of the zoom element. The zoom element 21 is arranged to control movement of the flash forming element 10 to obtain a flash light having a beam lobe with a desired beam angle.

The flash forming element 10 is axially movable within the flash housing 2 to control the beam angle of the flash light beam lobe.

In one example, the rotational movement of the zoom element 21 is mechanically translated to the axial movement of the flash forming element.

In the example illustrated in FIG. 10, the flash housing 2 comprises a transfer element 24 arrange to transfer the rotational movement or position of the zoom element 21 to an electrical signal. The axial movement or position of the flash forming element 10 is controlled based on the electrical signal. The transfer element 24 comprises for example a potentiometer, a Hall element, optical sensors or the like, arranged to transfer the rotational movement or position of the zoom element to the electrical signal. Different solutions for translating an axial movement or position to an electrical signal are well known in the art and will not be discussed in further detail herein.

The electrical signal controls a positioner 14, 15, 16 for control of the movement or the position of the flash forming element. The flash forming element 10 is axially movable within the flash housing 2 to control the beam angle of the flash light beam lobe. The positioner is arranged to perform control of the positioner between two end positions, wherein when the flash forming element is in a first end position distant from the lens element, the flash light is incident on substantially the entire lens element and when the flash forming element is in a second end position closest to the lens element, the flash light is mainly incident on a center part of the lens element. The flash light beam lobe may have an essentially circular cross section.

The positioner 14, 15, 16 may comprise a motor 14. The motor may be an electrical motor. The electrical motor may be a step motor 14. The step motor is arranged to provide an angular rotation corresponding to the electrical signal fed to the positioner 14, 15, 16. In the illustrated example, the positioner further comprises a screw element 15. The screw element 15 is rotated axially back and forward by means of the step motor. The positioner may further comprise a guided nut 16 in engagement with the screw element 15. The flash forming element 10 is supported by the guiding nut 16. The guided nut is guided within the flash housing such that it is movable in an axial direction along the screw element and fixed in an angular direction. Thus, the guided nut can not 16 rotate. This is for example obtained by forming a support at least partly around the screw element within which support the guided nut can move axially by being prevented from rotation by the support wall(s). Accordingly, in accordance with this example solution, the flash forming element will be axially controlled back and forward within the flash housing based on the electrical signal provided by the rotation of the zoom element.

In the illustrated example, the flash forming element 10 is supported in a holder, which in turn is fastened to the guided nut 16.

In the illustrated example, the flash forming element, or holder holding the flash forming element, is further supported by at least one guiding pin 17 suspended in the flash housing. This at least one pin is mounted within the housing coaxially with the screw element 15. The function of the at least one simulation light element 11 guiding pin 17 is to further secure that the flash forming element is stably arranged within the flash housing and prevented to perform any rotational movements. When the flash holding element is guided both by the screw element and at least one guiding pin, rotational movements around the axis of the screw element/guiding pin(s) and rotational movements along the axis of the screw element/guiding pin(s) may be avoided.

What is claimed is:

1. A flash housing for photographic purposes, said flash housing comprising:
a flash former arranged to generate a flash light,
a lens arranged to let at least part of the generated flash light out of the flash housing, the lens having a substantially circular cross-section, and
a flash housing fastener for attachment of a flash light shaping tool, the flash housing fastener configured for attachment of the flash light shaping tool on top of the lens, the flash housing fastener arranged along a border of the lens, for magnetic engagement with a corresponding fastener at the flash light shaping tool, wherein the fastener of the flash light shaping tool is ring shaped and at least partly formed by a ferromagnetic material,
wherein the flash housing fastener is ring shaped and at least partly formed by a ferromagnetic material, and wherein the flash housing fastener has a fastening surface facing in the main direction of the flash light let out of the lens,
wherein the flash housing fastener is within an outside perimeter of the flash housing, and
wherein the fastening surface of the flash housing fastener is configured to connect to the fastener of the flash light shaping tool.

2. The flash housing according to claim 1, wherein the flash housing fastener radially extends from the plane of an external lens surface of the lens.

3. The flash housing according to claim 1, wherein the flash housing fastener encloses the entire border of the lens.

4. The flash housing according to claim 1, further comprising a zoom ring rotatably arranged coaxially with and outside the flash housing fastener and operatively connected to the flash so as to control movement of the flash by manual rotation of the zoom ring.

5. The flash housing according to claim 1, wherein at least a part of the flash housing fastener is between the flash housing and at least a part of the lens.

6. The flash housing according to claim 1, wherein the flash housing fastener or the fastener of the flash light shaping tool comprises at least one permanent magnet.

7. The flash housing according to claim 1, wherein the flash housing fastener is positioned on one side of a plane defined by an outer edge of the flash housing, the one side facing opposite the main direction of the flash light let out of the lens.

8. A set comprising a flash housing for photographic purposes and at least one flash light shaping tool, wherein the flash housing comprises a flash former arranged to generate a flash light and a lens arranged to let at least part of the generated flash light out of the flash housing,
wherein the flash housing and the at least one flash light shaping tool each comprises a respective fastener for magnetic engagement of the flash light shaping tool with the lens, the fastener of the flash housing arranged along a border of the lens and having a fastening surface facing in the main direction of the flash light let out of the lens, for magnetic engagement with the corresponding fastener at the flash light shaping tool, wherein the lens has a substantially circular cross-section,
wherein the fastener of the flash housing is ring shaped and at least partly formed by a ferromagnetic material,
wherein at least a part of the fastener of the flash housing is between the flash housing and at least a part of the lens, and
wherein the fastener of the flash light shaping tool is ring shaped and at least partly formed by a ferromagnetic material arranged to engage with the ring shaped fastener of the flash housing.

9. The set according to claim 8, wherein the fastener of the flash housing is within an outside perimeter of the flash housing.

10. The set according to claim 8, wherein the fastener of the flash housing radially extends from the plane of an external lens surface of the lens.

11. The set according to claim 8, wherein the flash housing further comprises a zoom ring arranged coaxially with and outside the fastener of the flash housing and operatively connected to the flash former so as to control movement of the flash former by manual rotation of the zoom ring.

12. The set according to claim 8, wherein the set comprises a plurality of flash light shaping tools that are stackable.

13. The set according to claim 12, wherein the flash light shaping tools are connected to each other by magnetic engagement.

14. The set according to claim 13, wherein each of the at least one flash light shaping tool comprises a respective additional fastener for magnetic engagement with another light shaping tool on top of one flash light shaping tool.

15. The set according to claim 8, wherein the fastener of the flash housing or the fastener of the flash light shaping tool comprises at least one permanent magnet.

16. The set according to claim 8, wherein the fastener of the flash housing is positioned on one side of a plane defined by an outer edge of the flash housing, the one side facing opposite the main direction of the flash light let out of the lens.

17. A flash light shaping tool for attachment to a flash housing for photographic purposes, said flash housing comprising a flash former arranged to generate a flash light and a lens arranged to let at least part of the generated flash light out of the flash housing, and a flash housing fastener for attachment of a flash light shaping tool, the flash housing fastener configured for attachment of a flash light shaping tool on top of the lens,
wherein the lens has a substantially circular cross-section,
wherein the flash housing fastener is ring shaped, is arranged along a border of the lens, has a fastening surface facing in the main direction of the flash light let out of the lens, and is at least partly formed by a ferromagnetic material,
wherein the flash light shaping tool comprises a first fastener, wherein the first fastener is ring shaped and at least partly formed by a ferromagnetic material arranged to engage magnetically with the ring shaped fastener of the flash housing on top of the lens,
wherein the flash light shaping tool is configured to engage the fastening surface in a recess of the flash housing, and
wherein the first fastener of the flash light shaping tool is configured to connect to the fastening surface of the flash housing fastener.

18. The flash light shaping tool according to claim 17, wherein the flash housing fastener radially extends from the plane of an external lens surface of the lens.

19. The flash light shaping tool according to claim 17, wherein the flash light shaping tool is stackable.

20. The flash light shaping tool according to claim 19, wherein the flash light shaping tool is attachable to another flash light shaping tool by magnetic engagement.

21. The flash light shaping tool according to claim 20, further comprising a second fastener for magnetic engagement with another flash light shaping tool on top of the flash light shaping tool.

22. The flash light shaping tool according to claim 21, wherein the flash light shaping tool comprises a holder for a flash light shaper.

23. The flash light shaping tool according to claim 22, further comprising the flash light shaper, said flash light shaper comprising a screen and being attached or attachable to and extending from the holder, wherein said screen being arranged in the beam path of at least a part of the flash light.

24. The flash light shaping tool according to claim 23, wherein the screen is at least partly reflective and arranged to re-direct at least a part of the flash light.

25. The flash light shaping tool according to claim 23, wherein the screen is arranged to diffuse at least a part of the flash light.

26. The flash light shaping tool according to claim 23, wherein the screen is made of a textile material.

27. The flash light shaping tool according to claim 23, wherein the screen is hood shaped.

28. The flash light shaping tool according to claim 27, wherein the hood shaped screen is collapsible and spring loaded and wherein the spring is semi-tensioned or substantially un-tensioned when the hood shaped screen is in its unfolded state and tensioned when the hood shaped screen is in its collapsed state.

29. The flash light shaping tool according to claim 23, wherein the flash light shaper supported by the holder comprises a lens.

30. The flash light shaping tool according to claim 22, wherein the holder comprises a first and a second holder part arranged to support an exchangeable flash light shaper by magnetic engagement between the first and second holder parts.

31. The flash light shaping tool according to claim 30, wherein the first and second fasteners are arranged to provide the magnetic engagement.

32. The flash light shaping tool according to claim 30, further comprising third and fourth fasteners arranged to provide the magnetic engagement between the first and second holder parts.

33. The flash light shaping tool according to claim 22, further comprising the flash light shaper, the flash light shaper comprising a dome shaped diffuser element.

34. The flash light shaping tool according to claim 22, further comprising the flash light shaper, the flash light shaper comprising a wide lens.

35. The flash light shaping tool according to claim 22, further comprising the flash light shaper, the flash light shaper comprising a color filter.

36. The flash light shaping tool according to claim 17, wherein at least a part of the flash housing fastener is between the flash housing and at least a part of the lens.

* * * * *